Patented May 18, 1943

2,319,667

UNITED STATES PATENT OFFICE 2,319,667

INHIBITED HYGROSCOPIC SALT SOLUTION

Alvin M. Edmunds, Midland, Mich., assignor to The Dow Chemical Company, Midland, Mich., a corporation of Michigan No Drawing. Application June 14, 1941, Serial No. 398,117

11 Claims. (Cl. 23—89)

This invention relates to a composition and method for retarding the corrosion of ferrous metal surfaces by hydroscopic salt solutions. It also concerns hygroscopic salt solutions of reduced corrosiveness.

Concentrated solutions of hygroscopic salts, especially solutions of calcium and lithium halides, are adapted for use in a variety of industrial processes such as the dehydration of moist gases. However, since most such processes are carried out in steel apparatus, and since ordinary hygroscopic salt solutions sometimes tend seriously to attack ferrous metals, the use of such solutions occasionally gives rise to difficult operating problems, not only because the corrosive attack may shorten the useful life of the equipment but also because the products of corrosion may collect as solid deposits in the apparatus and impede the circulation of the hygroscopic solution.

A number of inhibitors for minimizing this corrosion have been suggested, but they are for the most part relatively ineffective, and often fail utterly when the hygroscopic solution is heated at temperatures above 200° F., in some cases even accelerating the rate of corrosion at these temperatures.

It has now been found, however, that the corrosion of ferrous metals by hygroscopic salt solutions may effectively be retarded even at temperatures well above 200° F., by dissolving in the solution a small proportion of an arsenite.

The use of arsenites according to the invention is directed principally to retarding the corrosion of ferrous metals by hygroscopic solutions essentially comprising a halide of at least one of the metals calcium and lithium, and is particularly effective in the case of solutions containing a substantial proportion of calcium bromide or of calcium bromide and calcium chloride. Typical hygroscopic solutions to which the invention has been successfully applied are strong calcium chloride brines, aqueous solutions of calcium chloride and glycerol, and aqueous solutions containing both calcium bromide and calcium chloride (U. S. Patent 2,033,934), and calcium bromide and lithium bromide (U. S. Patent 2,143,008).

The arsenite inhibitor should, of course, be added to the hygroscopic solution in a concentration sufficient substantially to retard the corrosion of ferrous metals, a concentration corresponding to 0.02 to 2.0 parts of arsenite per 100 parts of solution ordinarily being satisfactory. However, since many of the heavy metal arsenites are insoluble in certain hygroscopic solutions, the arsenites of the alkali- and alkaline-earth metals are customarily employed. An arsenite of sodium, such as that obtained by dissolving arsenic trioxide in a somewhat less than chemically equivalent quantity of sodium hydroxide solution, is particularly convenient. In general, this latter arsenite inhibitor remains fully dissolved in the hygroscopic solution, even in the case of calcium chloride-containing solutions from which precipitation of insoluble calcium arsenite might have been expected, provided the arsenite is added to the hygroscopic solution with vigorous agitation, and, if necessary, with simultaneous application of heat.

Arsenite-containing hygroscopic solutions according to the invention may satisfactorily be employed in any process to which hygroscopic solutions are ordinarily placed. They are particularly advantageous in cyclic processes for dehydrating moist acid-containing gases, such as wet sulfide-containing natural gas, in which the hygroscopic solution is first passed into contact with the gas to remove moisture therefrom, after which the resulting diluted solution is regenerated by heating at temperatures well above 200° F. to drive off water. In such processes as ordinarily carried out, the hygroscopic solution soon becomes acid by contact with the gases being dried, often attaining a pH value as low as 3 to 4. As a result, the corrosion normally caused by the electrolytic action of the hygroscopic solution is aggravated by acidic corrosion from the dissolved acid and in consequence attack of the apparatus occurs with extreme rapidity, rendering further operation practically impossible after a comparatively short time. However, with the arsenite-containing solution of the invention, even under these extreme conditions corrosion is reduced to a very low value, and continuous trouble-free operation is possible over long periods of time.

In those gas dehydration processes of the character just mentioned in which removal of water from the diluted hygroscopic salt solution at temperatures above 200° F. is accomplished by actually boiling the solution, an additional corrosion problem arises, vis. attack of those portions of the equipment which, although not in direct contact with the hygroscopic solution itself, are exposed to the vapors or spray of the boiling liquid. In such cases the protective action of the arsenite inhibitor according to the invention may advantageously be augmented by adding to the solution a small proportion, usually 0.002 to 2.0 per cent by weight, of an organic nitrogen base. It has been found that the added base tends to volatilize during the boiling and functions as an inhibitor to retard corrosion of the equipment by the vapors and liquid spray, while the dissolved arsenite substantially prevents corrosion of the equipment by direct contact with the boiling hygroscopic solution itself; the equipment is fully protected throughout. Typical nitrogenous bases which may be used in this way are alkyl amines such as amyl amine, amino-alcohols such as triethanol-amine and tetramethyl diamino isopropanol, aryl amines, e. g. aniline and para phenylene diamine, aralkyl amines such as benzyl amine, and heterocyclic nitrogen bases such as pyridine, quinoline, and piperazine hydrate. However, by far the best results are obtained when the nitrogen base added is an aryl guanidine, particularly diphenyl guanidine.

In an alternative form of the invention, a mixture of an aryl guanidine, e. g. diphenyl guanidine, and an alkali- or alkaline-earth metal arsenite, e. g. sodium arsenite, may be prepared in advance, and then mixed in small proportion with the hygroscopic salt solution to be inhibited.

The following examples will serve further to illustrate the invention, but are not to be construed as limiting its scope:

Example 1

A weighed polished sample of mild steel was partially submerged for seven days in a hygroscopic salt solution exposed to the air and maintained a temperature of 200° to 220° F., the solution consisting essentially of 45.4 parts by weight of calcium bromide and 8.59 parts of calcium chloride dissolved in 46 parts of water and having been adjusted to a pH value of 4.0, by addition of hydrochloric acid. At the end of the test, the sample, the surface of which was badly pitted, was cleaned of corrosion product and reweighed. The observed loss in weight referred to the submerged area of the steel sample corresponded to a corrosion rate of 0.876 pound per square foot per year.

In another test run under identical conditions, except that the hygroscopic salt solution contained 0.5 per cent by weight of an arsenite inhibitor solution prepared by dissolving 4.0 parts of arsenic trioxide in a solution of 1.0 part of sodium hydroxide in 7.09 parts of water, the steel sample was apparently unchanged, and there was no observable loss in weight.

Example 2

The tests of Example 1 were repeated, with the exception that an atmosphere of natural gas containing hydrogen sulfide in a concentration of 2 grains per 100 cubic feet was maintained over the hygroscopic solutions during the tests. In this case, the corrosion rate of the steel sample submerged in the arsenite-containing hygroscopic solution was only 7.4 per cent as great as that of the sample exposed to the uninhibited solution.

Example 3

The tests of Example 1 were repeated with a hygroscopic solution consisting of 35.0 parts of calcium bromide, 9.85 parts of calcium chloride, and 26.5 parts of lithium bromide, the temperature being maintained at 300° F. The corrosion rate of the sample exposed to the solution containing 0.5 per cent by weight of sodium arsenite inhibitor was only 10.8 per cent of that exposed to the uninhibited solution.

Example 4

A weighed polished steel sample was partially submerged for seven days in a hygroscopic solution exposed to air and maintained at a temperature of 200° F., the solution consisting of 45.4 parts of calcium bromide, 8.59 parts of calcium chloride, and 46.0 parts of water, and having been adjusted to a pH value of 4.5. At the end of the test the submerged portion of the sample was found to have undergone a loss in weight corresponding to a corrosion rate of 2.19 pounds per square foot per year.

In another test conducted under identical conditions, except that 0.5 per cent of the sodium arsenite inhibiting solution of Example 1 and 1.0 per cent of diphenyl guanidine had been added to the hygroscopic solution, the corrosion rate was only 4.0 per cent of that caused by the uninhibited solution.

It is to be understood that the foregoing description is illustrative rather than strictly limitative of the invention and that the latter is co-extensive in scope with the following claims.

I claim:

1. As a composition of matter, a hygroscopic salt solution essentially comprising a halide of at least one of the metals calcium and lithium and having dissolved therein as an inhibitor for retarding corrosion of ferrous metals small proportions of an arsenite and an organic nitrogen base.

2. A composition according to claim 1 wherein the organic nitrogen base is an aryl guanidine.

3. As a composition of matter, a hygroscopic salt solution essentially comprising calcium bromide and having dissolved therein as an inhibitor for preventing corrosion of ferrous metals small proportions of an arsenite of sodium and of diphenyl guanidine.

4. A composition according to claim 3 wherein the salt solution essentially comprising both calcium chloride and calcium bromide.

5. A corrosion inhibitor for use in retarding the corrosion of ferrous metal surfaces by hygroscopic salt solutions consisting essentially of a mixture of an aryl guanidine and a substance selected from the class consisting of the arsenites of alkali- and alkaline-earth metals.

6. A corrosion inhibitor for use in retarding the corrosion of ferrous metal surfaces by hygroscopic salt solution consisting essentially of a mixture of diphenyl guanidine and an arsenite of sodium.

7. In a process wherein a hygroscopic salt solution essentially comprising a halide of at least one of the metals calcium and lithium is circulated in contact with ferrous metal surfaces, the method of retarding corrosion of such surfaces by the solution which comprises dissolving in the solution small proportions of an arsenite and of an organic nitrogen base.

8. In a process wherein a hygroscopic salt solution essentially comprising calcium bromide is circulated in contact with ferrous metal surfaces, the method of retarding corrosion of such surfaces by the solution which comprises dissolving in the solution small proportions of an arsenite of sodium and of an aryl guanidine.

9. In a cyclic process of dehydrating moist acid-containing gas, during one step of which an acidic hygroscopic salt solution essentially comprising a halide of at least one of the metals calcium and lithium is heated at temperatures above 200° F. in contact with ferrous metal surfaces to drive off water from the solution, the method of retarding corrision of the said surfaces by the heated acidic solution which comprises maintaining dissolved in the solution small proportions of an arsenite and of an organic nitrogen base.

10. In a process of dehydrating moist acid-containing gas, during one step of which an acidic hygroscopic salt solution essentially comprising calcium bromide is heated at temperatures above 200° F. in contact with ferrous metal surfaces to drive off water from the solution, the method of retarding corrosion of the said metal surfaces exposed to direct contact with the heated solution and with the vapor being driven off therefrom which comprises maintaining dissolved in the solution small proportions of an arsenite of sodium and of diphenyl guanidine.

11. The method according to claim 9 wherein the organic nitrogen base is an aryl guanidine.

ALVIN M. EDMUNDS.